June 11, 1935.  G. E. NERNEY  2,004,415
CONTAINER FOR SPECTACLE TEMPLES
Filed July 14, 1932
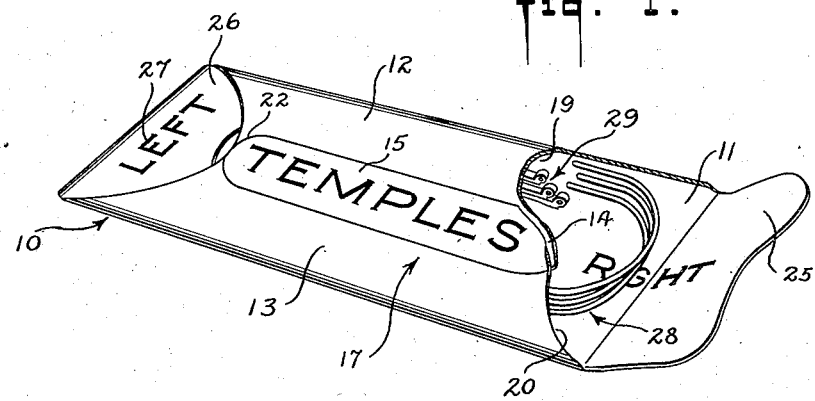
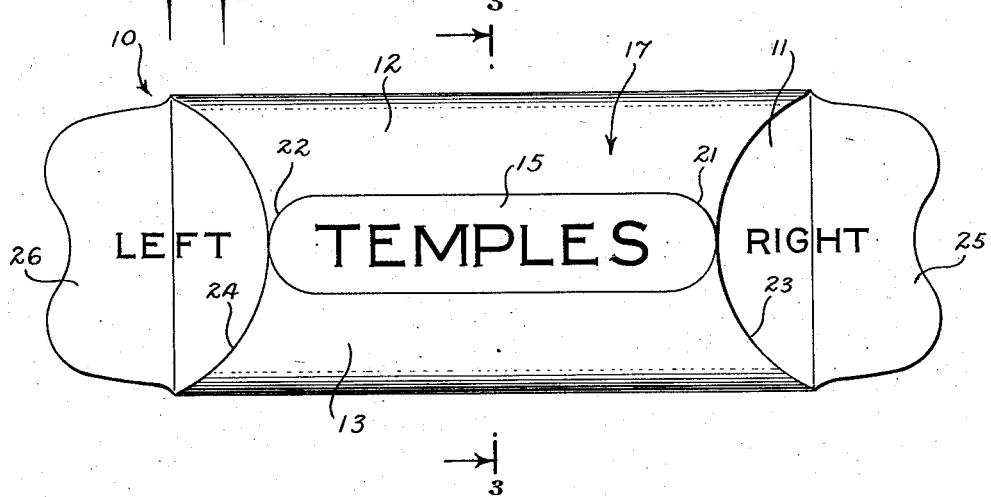
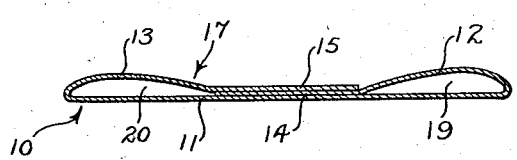
INVENTOR
George E. Nerney
BY
ATTORNEYS Patented June 11, 1935

2,004,415

UNITED STATES PATENT OFFICE 2,004,415

CONTAINER FOR SPECTACLE TEMPLES

George E. Nerney, Attleboro, Mass., assignor to Bay State Optical Company, Attleboro, Mass., a corporation of Maine Application July 14, 1932, Serial No. 622,385

6 Claims. (Cl. 206—5)

This invention relates to a container for temples of spectacles.

One of the objects of this invention is to provide a container for temples which will be strong, durable and thoroughly practical. Another object is to provide a device of the above character which may be easily manufactured at a minimum cost. Another object is to provide a device of the above character which may be constructed from inexpensive and light materials. Another object is to provide a device of the above character which will retain a considerable quantity of temples for shipment or storage in a safe and convenient manner. Another object is to provide a device of the above character which will retain separately, groups of temples having the same characteristics. Other objects will be in part obvious and in part pointed out hereinafter.

The invention accordingly consists in the features of construction, combinations of elements, and arrangements of parts as will be exemplified in the structure to be hereinafter described, and the scope of the application of which will be indicated in the following claims.

In the accompanying drawing, in which is shown one of the various possible embodiments of this invention, Figure 1 is a perspective view, partially fragmentary, of my container for temples, with temples positioned therein;

Figure 2 is a top plan view of my container, open and ready for the insertion of temples, and Figure 3 is a vertical sectional view taken along the line 3—3 of Figure 2.

Similar reference characters refer to similar parts throughout the several views of the drawing.

As conducive to a clearer understanding of certain features of this invention, it might be pointed out here that the storage and shipment of eyeglass parts and, more particularly, the temples of spectacle frames, have presented many difficulties. According to present practice, many types of spectacle frames are shipped from the manufacturer to the wholesaler or retailer in dismantled form and generally the temples of the frames are shipped separately and in groups. These temples are so formed that they must be fitted to one side of the frame, thus they are commonly known as "lefts" or "rights", these terms denoting their positions when in place upon the frame. If a large quantity of temples are shipped to a retailer, for example, and subsequently stored in a large group pending assembly, the retailer must spend extra time looking for the particular temple which he desires when assembling the frames. For example, the assembler may desire a "right" to finish assembling the frame and usually he must search through a large assortment of temples until he finds that one which he requires. One of the objects of this invention is to provide a device for overcoming the above-mentioned difficulties, as well as many others, in a successful and practical manner.

Referring now to Figure 1, there is shown a container generally indicated at 10 comprising a base 11 and two flaps 12 and 13 extending inwardly over base 11. As more clearly shown in Figure 3, edge portions 14 and 15 of flaps 12 and 13 respectively overlap each other substantially at the central portion of base 11 and I prefer to secure these parts together by any suitable adhesive material as, for example, mucilage.

Accordingly, flaps 12 and 13 form a top, generally indicated at 17, for base 11 and the central portion of the top formed by flaps 12 and 13 is secured to the central portion of base 11 (Figure 3) preferably by an adhesive material such as that described above. Top 17 is preferably of a greater width than base 11 so that when secured to base 11 along its central portion, as more clearly shown in Figure 3, the free parts of the flaps bulge upwardly to form channels 19 and 20. Preferably the connection between top 17 and base 11 takes the form shown in Figure 2, so that the opposite ends 21 and 22 thereof are rounded.

The opposite ends 23 and 24 of top 17 are preferably cut inwardly to expose a portion of the top surface of base 11. Preferably the ends of top 17 along the central portion thereof lie adjacent ends 21 and 22 of the connection between top 17 and base 11 (Figure 2). Secured to and preferably forming a part of base 11 is a pair of flaps 25 and 26 (Figure 2) adapted to fold inwardly over the exposed portions of base 11 and fit underneath top 17. The outer ends of flaps 25 and 26 are cut inwardly substantially at their central portions, thus being shaped to fit against the rounded ends 21 and 22, when the flaps are in their closed position, while the longer ends of the flaps fit underneath top 17 within channels 19 and 20. Preferably formed or otherwise stamped upon flap 25 and base 11 is the word "right", while the word "left" appears upon flap 26 and base 11. However, it should be realized that the positions of these words are quite immaterial and they might easily be reversed. I also prefer to print or otherwise form these words on the outer side of flaps 25 and 26 in a manner similar to that denoted at 27 in Figure 1.

When the temples have been completed at the place of manufacture, they may be grouped into "lefts" and "rights". Subsequently, before shipment, they may be placed in container 10, a group of the "rights", generally indicated at 28, preferably being inserted in channel 20 so that the U-shaped portions thereof lie upon the exposed portion of base 11 at the right-hand end of the container, as viewed in Figure 1. Similarly, a group of "lefts", generally indicated at 29, may be inserted in channel 19 so that the U-shaped portions thereof lie on the exposed portion of base 11 at that end of the container. After closing flaps 25 and 26 and preferably sealing them in the position of flap 26 in Figure 1, the temples are ready for shipment. When the retailer, for example, receives them, he may store them in these containers until he is ready to assemble the frame. By opening flaps 25 and 26, the temples may be removed and if, for example, a "right" is desired, one of the temples 28 may be removed as denoted by the indicia both on the inside and outside of flap 25. In a similar manner, the retailer may select a "left" when desired. Accordingly, not only does container 10 serve as a practical shipping receptacle but it also may be used to advantage in the subsequent storage of temples pending the assembly of spectacle frames.

It will thus be seen that I have provided a thoroughly practical and efficient device in which the several objects hereinabove referred to, as well as many others, are successfully accomplished.

As many possible embodiments may be made of the above invention and as many changes might be made in the embodiment above set forth, it is to be understood that all matter hereinabove set forth or shown in the accompanying drawing is to be interpreted as illustrative and not in a limiting sense.

I claim:

1. A container for temples of spectacles comprising a flat oblong member, a pair of members connected to opposite sides of said member and extending over one surface thereof, said members being connected to said first-mentioned member substantially along the center line and being cut inwardly to expose portions of the surface of said first-mentioned member at the opposite ends thereof, and a pair of flaps at the opposite ends of said first-mentioned member adapted to fold inwardly and fit under said second-mentioned members whereby said exposed surface portions of said first-mentioned member may be temporarily covered.

2. A container for temples of spectacles comprising an oblong part, a top therefor, means connecting said top and said part to form a pair of channels between said part and said top, said top being cut inwardly at its opposite ends to expose portions of temples when temples are positioned in said channels and a pair of flaps at the opposite ends of said oblong part adapted to fit under said top when in closed position, said flaps being cut inwardly so that said flaps may be released from said closed position.

3. A container for temples of spectacles comprising an oblong part, a top therefor, means connecting said top and said part to form a pair of channels between said part and said top, said top being cut inwardly at its opposite ends to expose the U-shaped portions of temples when temples are positioned in said channels, flaps at the opposite ends of said part adapted to fit over said exposed portions of said temples and beneath said top, and indicia located at the opposite ends of said container denoting the nature of the temples which may be removed from or inserted at that end.

4. A container for spectacle temples comprising an oblong body portion, a pair of flaps secured to the longer sides of said body portion and adapted to form two substantially similar channels when folded upon and secured to said body portion, said flaps being cut away at the opposite ends thereof whereby substantial areas of said body portion are exposed, and a pair of closure members secured to the shorter sides of said body portion and adapted to fold inwardly over said areas, said members having portions adapted to fit within said channels under said flaps and center portions spaced from said flaps when said members are in said closed position so that said members may be released from said closed position.

5. A container for spectacle temples comprising an oblong body portion having flat top and bottom sides, the top side thereof being cut away at its opposite ends whereby substantial areas of the bottom side thereof are exposed, and a pair of closure members secured to the opposite ends of said bottom side and adapted to fold inwardly over said areas and under said top side, thus being retained in this position by said top side.

6. A container comprising an oblong body portion having flat top and bottom sides, said sides being secured together substantially along their center lines to form two longitudinal channels for the reception of temples, the top side being cut away to its opposite ends to expose substantial areas of the bottom side, and a pair of flaps secured to the bottom side and adapted to extend under said top side over said areas.

GEORGE E. NERNEY.